3,403,156
N-ACYL SUBSTITUTED POLYCYCLIC ISOQUINOLINES

Leslie G. Humber, Dollard des Ormeaux, Quebec, and Martin A. Davis, Montreal, Quebec, Canada, assignors to American Home Products Corporation, New York, N.Y., a corporation of Delaware
No Drawing. Filed June 7, 1966, Ser. No. 555,701
10 Claims. (Cl. 260—286)

ABSTRACT OF THE DISCLOSURE

The compounds 2-(3-chloropropionyl)-, 2-(2-chloroacetyl)-, 2-(3-dimethylaminopropionyl)-, 2-(3-methylaminopropionyl)-, 2-(2-dimethylaminoacetyl)-, 2-(N-methyl-N-formyl-3-aminopropionyl)-, and 2-acetyl-1,2,3,7,8,12b-hexahydrobenzo[6,7]cyclohepta[1,2,3 - d,e]isoquinoline and their preparation are disclosed. These are characterized by possessing anti-bacterial, trichomonicidal, and central nervous system depressant activities. Useful compositions capable of utilizing these properties are also disclosed.

---

This invention relates to certain N-acyl substituted polycyclic isoquinoline derivatives, more particularly, to an 1,2,3,7,8,12b - hexahydrobenzo[6,7]cyclohepta[1,2,3-d,e]isoquinoline nucleus, substituted on the nitrogen atom with an acyl group. The scope of this invention is illustrated by the generic Formula I

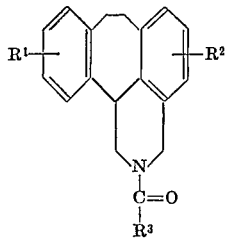

I.

in which $R^1$ and $R^2$ may represent one or more substituents on an aromatic ring, such substituents including lower alkyl groups containing from 1–3 carbon atoms, halogen, hydroxyl, an alkylthio group containing from 1–3 carbon atoms, and triahalomethyl groups, and in which $R^3$ may represent hydrogen, lower alkyl, halo-substituted lower alkyl, lower alkylamino-substituted lower alkyl, di-lower alkylamino-substituted lower alkyl, N-lower alkyl-N-lower acylamino-substituted lower alkyl, or a heterocyclic-lower alkyl group in which the heterocyclic moiety is a saturated nitrogen containing ring, containing from 4–7 carbon atoms and from 1–2 hetero atoms. The lower alkyl groups in all the above definitions contain from 1–3 carbon atoms.

The compounds in which $R^3$ represents a group containing a basic nitrogen atom are capable of forming acid addition salts, and such salts with pharmacologically acceptable acids are also within the scope of this invention.

This invention also relates to a process for the preparation of the pharmacologically active compounds of Formula I, described herein in which $R^3$ is as defined above, and to intermediates used in their preparation. This process is illustrated schematically in the following formulae, and is described further in the examples.

The starting materials for the preparation of the compounds of this invention are of Formula II, and those latter compounds, wherein $R^1$ and $R^2$ represent hydrogen are prepared from 1,6,7,11b-tetrahydro-2H-dibenz[cd,h]azulene-2-one (C. Van Der Stelt, et al. Receuil des Travaux Chimiques des Pays-Bas, vol. 84, p. 1466, (1965)) by reaction with sodium azide in trichloroacetic acid to yield 3-oxo-1,2,3,7,8,12b-hexahydrobenzo[6,7]cyclohepta[1,2,3-d,e]isoquinoline, which latter compound is reduced with an alkali metal hydride to yield 1,2,3,7,8,12b-hexahydrobenzo[6,7]cyclohepta[1,2,3-d,e]isoquinoline.

Starting with azulene derivatives appropriately substituted in the aromatic rings, the compounds of Formula II wherein $R^1$ and $R^2$ have the same significance as is in Formula I are also obtained. These reactions are also described in our co-pending U.S. patent application S.N. 484,440 filed Sept. 1, 1965, issuing as a patent simultaneously herewith.

More specifically, the compounds of Formula II, wherein $R^1$ and $R^2$ have the same significance as above are condensed with compounds of formula $R^4$—CO—X, wherein X represents an activating group, such as, for example, a halogen atom, or an acyloxy group, and wherein $R^4$ may represent hydrogen, lower alkyl, or halo-substituted lower alkyl, to yield compounds of structure III wherein $R^4$ is as defined above. The above condensation may be carried out in the presence of an inert solvent, such as, for example an aromatic hydrocarbon solvent, or a halogenated hydrocarbon solvent, or, alternatively, the condensation may be effected in the absence of a solvent, in both instances, the temperature range of the condensation lying between the limits of 0° and 100°.

The compounds of structure III, with $R^4$ representing a halo-substituted lower alkyl group, may be condensed with a reagent of formula

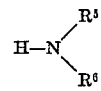

wherein $R^5$ may be hydrogen and $R^6$ may be a lower alkyl group, or, where both $R^5$ and $R^6$ may be lower alkyl groups, or where

represents a nitrogen containing heterocyclic group containing from 4–7 carbon atoms and from 1–2 hetero atoms, to afford the compounds of Formula IV, wherein $R^7$ represents lower alkyl-amino-substituted lower alkyl, or di-lower alkylamino-substituted lower alkyl, or a nitrogen-containing heterocyclic-lower alkyl group containing from 4–7 carbon atoms and from 1–2 hetero atoms in the heterocycle, and from 1–3 carbon atoms in the lower alkyl group, the condensation being conducted in a sealed tube at a temperature between 50 and 100° C. and in a suitable solvent such as, for example, ethanol or, benzene.

The compounds of Formula IV where $R^7$ represents lower alkylamino substituted lower alkyl may be reacted with an acylating agent, $R^4$—CO—X, wherein X is as defined above and $R^4$ may represent hydrogen or lower alkyl, to yield the compounds of Formula V, wherein $R^8$ represents an N-lower alkyl-N-lower acylamino-substituted lower alkyl group.

The following formulae will illustrate the above process. In those formulae it is understood that the compounds of Formulae III, IV, and V all correspond to the compounds of Formula I, in which $R^3$ is defined as encompassing all the definitions of $R^4$, $R^7$, and $R^8$ listed above.

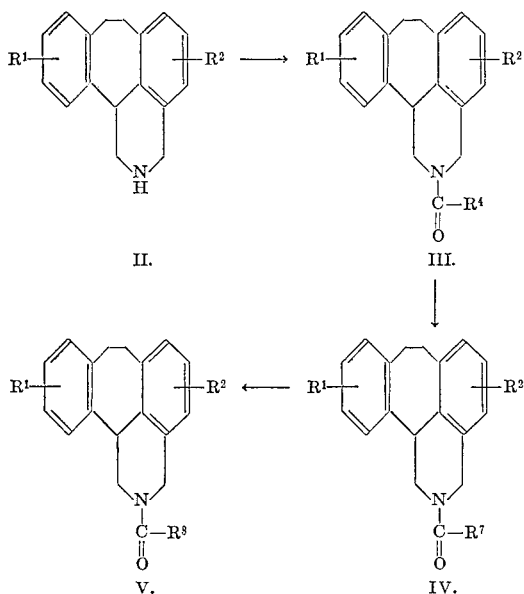

In the above formulae it is understood that the compounds of Formulae III, IV, and V all correspond to the compounds of Formula I, in which $R^3$ is defined as encompassing all the definitions of $R^4$, $R^7$, and $R^8$ listed above.

The compounds of this invention of Formula I possess useful pharmacological properties as central nervous system depressants, as antibacterial agents, and as trichomonicidal agents. As antibacterial agents they are active against *Staphyloccus pyogenes* (both penicillin-sensitive and penicillin-resistant strains), *Sarcina lutea*, *Streptococcus faecalis*, *Escherichia coli*, *Aerobacter aerogenes*, *Salomonella pullorum*, *Pseudomonas aeruginosa*, *Proteus mirabilis*, and *Proteus vulgaris*; as trichomonicidal agents they are active against *Trichomonas vaginalis* and *Trichomonas foetus*. For these uses, the compounds of Formula I may be formulated as solutions, creams, or lotions with pharmacologically acceptable vehicles containing from 0.1 to 1.0 percent of the active ingredient. Such formulations may be applied topically at the site of infection as required. As central nervous system depressants the compounds of this invention may be formulated with suitable excipients in the form of capsules or tablets containing from 10 to 60 mg. of the active ingredient and may be administered in divided doses totalling from 60 to 160 mg. per day.

The following examples will illustrate this invention.

EXAMPLE 1

2-(3-chloropropionyl)1,2,3,7,8,12b-hexahydrobenzo-[6,7]cyclohepta[1,2,3-d,e]isoquinoline To a solution of 1,2,3,7,8,12b-hexahydrobenzo[6,7] cyclohepta[1,2,3-d,e]isoquinoline (39.0 gm.) in dichloromethane (400 ml.) is added with stirring and cooling, 3-chloropropionyl chloride (60 ml.) over a period of 15 minutes. The reaction mixture is refluxed for 2 hours, and then the solvent is removed in vacuo. The residual oil is triturated with ether and the resulting solid is crystallized from a methanol-benzene mixture to yield the title compound, M.P. 151–152° C.

Analysis confirms the empirical formula $C_{20}H_{20}ClNO$.

By working in the same manner as described above, but using 2-chloroacetyl chloride instead of 3-chloropropionyl chloride there is obtained 2-(2-chloroacetyl) 1,2,3,7,8,12b - hexahydrobenzo[6,7]cyclohepta[1,2,3-d,e] isoquinoline, M.P. 146–148°, its empirical formula $C_{19}H_{18}ClNO$ being confirmed by analysis.

EXAMPLE 2

2-(3-dimethylaminopropionyl)-1,2,3,7,8-12b-hexahydrobenzo[6,7]cyclohepta[1,2,3-d,e]isoquinoline Dimethylamine (14 ml.) and 2-(3-chloropropionyl)-1,2,3,7,8,12b - hexahydrobenzo[6,7]cyclohepta[1,2,3-d,e,] isoquinoline (14 gm.) are combined with ethanol (100 ml.) and heated in a sealed tube at 85° for 22 hours. The solvents are removed in vacuo and the residue is distributed between chloroform and saturated aqueous sodium carbonate. The organic phase yields the title compound, M.P. 90–91° on crystallization from a benzene-hexane mixture. The empirical formula $C_{22}H_{26}N_2O$ is confirmed by analysis.

By working as described above, but using monomethylamine instead of dimethylamine, 2-(3-methylaminopropionyl) - 1,2,3,7,8,12b - hexahydrobenzo[6,7]cyclohepta-[1,2,3-d,e]isoquinoline is obtained, characterized by an infrared absorption band at $\nu_{max.}$ 1650 cm.$^{-1}$. The hydrochloride salt is prepared by reaction with ethereal hydrogen chloride and crystallization to M.P. 246–247° and its empirical formula is confirmed by analysis.

Similarly, by using as starting materials dimethylamine and 2-(2-chloroacetyl) - 1,2,3,7,8,12b - hexahydrobenzo-[6,7]cyclohepta[1,2,3 - d,e]isoquinoline the compound 2-(2-dimethylaminoacetyl)1,2,3,7,8,12b-hexahydrobenzo-[6,7]cyclohepta[1,2,3-d,e]isoquinoline, M.P. 123–125° C. is obtained. Its hydrochloride salt, prepared as above, has a M.P. 232–235° C. and its empirical formula is confirmed by analysis.

EXAMPLE 3

2-(N-methyl-N-formyl-3-aminopropionyl)-1,2,3,7,8,12b-hexahydrobenzo[6,7]cyclohepta[1,2,3-d,e,]isoquinoline A mixture of formic acid (3.75 ml.) and acetic anhydride (8.7 ml.) is converted to formic acetic anhydride by heating at 60° for 2 hours. To this reagent at 10° there is added 2-(3-methylaminopropionyl)-1,2,3,7,8,12b-hexahydrobenzo[6,7]cyclohepta[1,2,3-d,e]isoquinoline (6.84 gm.). The mixture is stirred at room temperature overnight and is poured into ice water and extracted with benzene. The benzene phase yields the title compounds with M.P. 158–160° C. upon crystallization from a benzene-hexane mixture. The empirical formula $$C_{22}H_{24}N_2O_2$$

is confirmed by analysis.

By working as described above but using 1,2,3,7,8,12b-hexahydrobenzo[6,7]cyclohepta[1,2,3-d,e]isoquinoline instead of 2-(3-methylaminopropionyl)-1,2,3,7,8,12b-hexahydrobenzo[6,7]cyclohepta[1,2,3-d,e]isoquinoline, N-formyl-1,2,3,7,8,12b - hexahydrobenzo[6,7]cyclohepta[1,2,3-d,e]isoquinoline, M.P. 130–132° C., is obtained. The empirical formula $C_{18}H_{17}NO$ is confirmed by analysis.

EXAMPLE 4

2-acetyl-1,2,3,7,8,12b-hexahydrobenzo[6,7]cyclohepta [1,2,3-d,e]isoquinoline 1,2,3,7,8,12b - hexahydrobenzo[6,7]cyclohepta[1,2,3-d,e]isoquinoline (9.4 gm.), pyridine (50 ml), and acetic anhydride (40 ml.), are combined and allowed to remain at room temperature overnight. Water is added and the resultant precipitate is isolated by filtration. Crystallization from methanol yields the title compound, with M.P. 124–126° C., and its empirical formula $C_{19}H_{19}NO$ is confirmed by analysis.

We claim:

1. 2 - (3-chloropropionyl)1,2,3,6,7,12b - hexahydrobenzo[6,7]cyclohepta[1,2,3-d,e]isoquinoline.

2. 2 - (2-chloroacetyl)1,2,3,7,8,12b - hexahydrobenzo [6,7]cyclohepta[1,2,3-d,e]isoquinoline.

3. 2 - (3 - dimethylaminopropionyl) - 1,2,3,7,8,12b-hexahydrobenzo[6,7]cyclohepta[1,2,3-d,e]isoquinoline.

4. 2 - (3-methylaminopropionyl) - 1,2,3,7,8,12b-hexahydrobenzo[6,7]cyclohepta[1,2,3-d,e]isoquinoline.

5. The hydrochloride salt of 2-(3-methylaminopropionyl) - 1,2,3,7,8,12b - hexahydrobenzo[6,7]cyclohepta[1,2,3-d,e]isoquinoline.

6. 2 - (2-dimethylaminoacetyl) - 1,2,3,7,8,12b-hexahydrobenzo[6,7]cyclohepta[1,2,3-d,e]isoquinoline.

7. The hydrochloride salt of 2-(2 - dimethylaminoacetyl) - 1,2,3,7,8,12b - hexahydrobenzo[6,7]cyclohepta[1,2,3-d,e]isoquinoline.

8. 2 - (N - methyl-N-formyl - 3 - aminopropionyl)-1,2,3,7,8,12b - hexahydrobenzo[6,7]cyclohepta[1,2,3-d,e]isoquinoline.

9. N - formyl - 1,2,3,7,8,12b - hexahydrobenzo[6,7]cyclohepta[1,2,3-d,e]isoquinoline.

10. 2 - acetyl - 1,2,3,7,8,12b - hexahydrobenzo[6,7]cyclohepta[1,2,3-d,e]isoquinoline.

References Cited
UNITED STATES PATENTS

| | | | |
|---|---|---|---|
| 2,974,143 | 3/1961 | Schmidt et al. | 260—286 |
| 3,258,488 | 6/1966 | Judd et al. | 260—283 X |

NICHOLAS S. RIZZO, *Primary Examiner.*

DONALD G. DAUS, *Assistant Examiner.*